C. O. HOOVER.
SEPARATING ALUMINUM CHLORIDE FROM HEAVY HYDROCARBON.
APPLICATION FILED APR. 3, 1922.
1,426,081.
Patented Aug. 15, 1922.
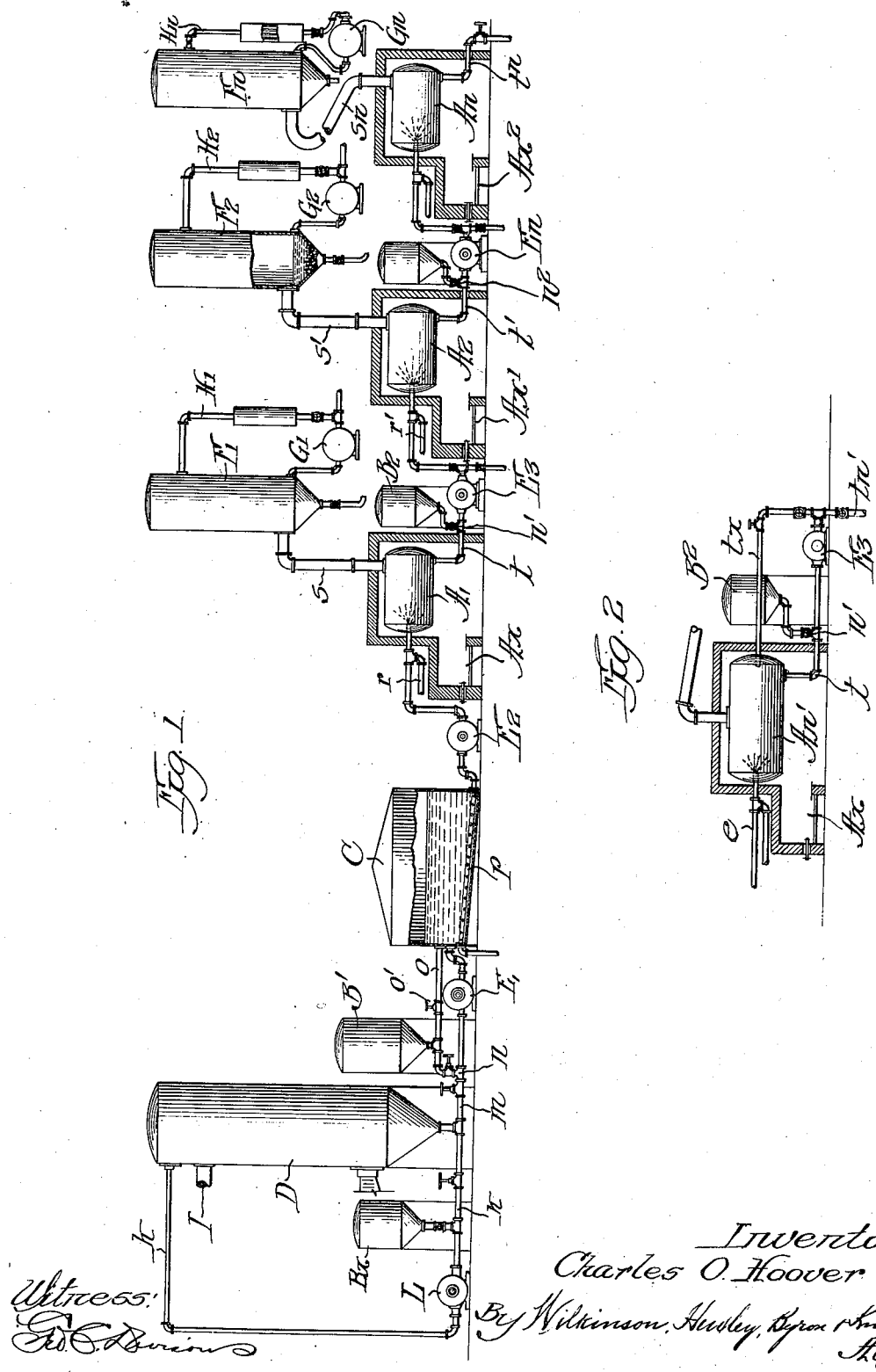
Inventor:
Charles O. Hoover

UNITED STATES PATENT OFFICE.

CHARLES OSCAR HOOVER, OF CHICAGO, ILLINOIS, ASSIGNOR TO THE HOOVER COMPANY, OF CHICAGO, ILLINOIS, A CORPORATION OF ILLINOIS.

SEPARATING ALUMINUM CHLORIDE FROM HEAVY HYDROCARBON.

1,426,081.  Specification of Letters Patent.  Patented Aug. 15, 1922.

Application filed April 3, 1922. Serial No. 548,912.

*To all whom it may concern:*

Be it known that I, CHARLES O. HOOVER, a citizen of the United States, residing at Chicago, in the county of Cook and State of Illinois, have invented certain new and useful Improvements in Separating Aluminum Chloride from Heavy Hydrocarbon, of which the following is a specification.

The primary object of this invention is to separate and recover, in a form in which it can be used as a catalyst for the treatment of petroleum fractions and similar substances, the aluminum chloride which exists in association with heavy hydrocarbons, for instance, aluminum chloride hydrocarbon which has become spent or partially spent in the contact chamber of a petroleum system.

The invention proceeds upon the principle of adding to the heavy or sluggish aluminum chloride hydrocarbon, as a step preliminary to subliming the same, a solvent having the capacity to increase fluidity of the aluminum chloride hydrocarbon and facilitate its passage through the pipe lines and pumps of the recovery system, or the capacity to facilitate separation of the aluminum chloride in the recovery chamber of the system. The character of the solvent may be such that it dissolves only one of the components of aluminum chloride hydrocarbon, that is, either the heavy hydrocarbon or else the aluminum chloride, or it may possess solvent properties with respect to both of these components. It may be desirable to use different kinds of solvents, respectively, active as to the two components, or both effective as to either or both of them; and these solvents may be introduced at different points in the process, or a mixture thereof may be introduced at one point therein.

In order that the invention may be fully understood, an illustrative form of apparatus suitable for practicing the invention is shown in the accompanying drawing, Figure 1 being an elevational view of the complete apparatus, and Figure 2 showing a modification.

The apparatus consists primarily of a series of recovery chambers $A_1$, $A_2$, $A_n$; a container or series of containers $B_1$, $B_2$, $B_n$ for solvent; one or more mixing tanks C; a source of aluminum chloride hydrocarbon, for instance the contact chamber D; and means such as pumps $E_1$, $E_2$, $E_3$, $E_n$, with their connecting pipes, for transferring aluminum chloride hydrocarbon to the mixing tank and to the several recovery chambers. The apparatus will also preferably involve as many absorption towers $F_1$, $F_2$, $F_n$, as may be necessary to absorb the volatiles released from the recovery chambers, for instance, by bringing said volatiles under the influence of a spray of hydrocarbon forwarded by pumps $G_1$, $G_2$, $G_n$, through pipes $H_1$, $H_2$, $H_n$. In the particular arrangement of apparatus here shown, the contact chamber D is one in which petroleum fractions to be treated are supplied through a pipe I in a manner to meet and become mingled with aluminum chloride hydrocarbon catalyst supplied through pipe K by pump L which draws the catalyst from the bottom of the contact chamber D as it separates by gravity from the oil being treated. When this aluminum chloride hydrocarbon becomes partially spent, it is drawn through pipe $m$ by pump $E_1$ and delivered to the mixing chamber C, but in passing to the pump $E_1$ it receives a charge of solvent through the valve $n$ from the solvent container $B_1$. The mixture thus entering the mixing tank $C_1$ may meet there another increment of solvent delivered through pipe $o$ controlled by valve $o'$. The mixture of solvent and aluminum chloride hydrocarbon is thoroughly agitated, as, for instance, by spraying in through perforated pipe $p$ a superheated gas of a character that would not impair the process, for instance, fixed gases from condensing system, which will be principally methane. After being sufficiently agitated to render it homogeneous, the mixture is delivered by pump $E_2$ in an atomized or finely subdivided form into the first recovery chamber $A_1$ kept up to subliming temperature by means of heat from any suitable source, such, for instance, as a furnace $A_x$. The mixture enters the chamber $A_1$, accompanied by a superheated gas supplied by pipe $r$, and in this recovery chamber a considerable portion of the aluminum chloride will be vaporized and separated so that it can be passed out through the pipe $s$ to the absorption tower $F_1$. The residual aluminum chloride hydrocarbon in the recovery chamber $A_1$ is withdrawn from the bottom of said chamber through pipe $t$ by pump $E_3$, receiving in its passage a new increment from the solvent container $B_2$, and is delivered together with a new increment of superheated gas from a pipe $r'$ in an atomized or finely subdivided condition, into the second recovery chamber $A_2$, which is kept up to subliming temperature by means of furnace $A_x'$. Here an additional portion of the aluminum chloride is vaporized, separated, and passed off through pipe $s$ to the absorption tower $F_2$. Residual aluminum chloride hydrocarbon from recovery chamber $A_2$ flows through pipe $t'$ past the solvent supply pipe $n_2$, through pump $E_n$, past superheated gas pipe $r_2$, and into an ensuing recovery chamber, and this operation is repeated as many times as may be necessary to get all of the recoverable value from the aluminum chloride hydrocarbon until the last recovery chamber $A_n$ is reached, where the mixture will be subjected to final subliming temperature from heat source $A_{x2}$, with recovery of volatile aluminum chloride through pipe $s_n$ and absorption tower $F_n$, the final residue of hydrocarbon and any unrecoverable fraction of aluminum chloride being discharged through discard pipe $t_n$.

From the foregoing description it will be seen that the method of procedure and the apparatus suggested provide for the subliming treatment of aluminum chloride hydrocarbon after the introduction of a solvent which renders the aluminum chloride particularly amenable to subliming action; that this subliming action is repeated as many times as may be necessary to carry the recovery of the aluminum chloride to the economical limit, with provision for the introduction of an increment of solvent as a preliminary to each sublimation; that the introduction of solvent previous to each sublimation may be controlled through the valves $n$, $n'$, $n_2$, at will, or omitted in any step subsequent to original supply of solvent, if desired; and that the mixture is conditioned and delivered under the subdividing influence of superheated gas into each subliming chamber.

As suggested in Figure 2, the feature of multiple sublimation with supply of an increment of solvent subsequent to the first, may be carried on in a single recovery chamber $A_n'$ by introduction thereinto of not only the primary mixture through pipe $e$, but introduction at the opposite end, through the pipe $t_x$, of the residue of aluminum chloride hydrocarbon discharged through pipe $t$, along with a new increment of solvent received through valve $n'$ from a solvent container $B_2$. By continually passing the residue out through pipe $t$, past solvent supplying valve $n'$, and pump $E_3$, and back through pipe $t_x$, the entire recovery can be effected in the chamber $A_n'$, until it becomes necessary to evacuate the recovery chamber of excessively thickened residue, which can be done by opening the pipe $t_n'$.

In its broadest aspect, the feature of the invention which consists in introducing a solvent into aluminum chloride hydrocarbon to render it more fluid is applicable to the step of catalyzing petroleum fractions in the contact chamber D; and to this end, a solvent chamber $B_x$ is connected with the catalyst circulating pipe K, preferably between the contact chamber D and the pump L, so that the partially spent catalyst which settles by gravity in the bottom of the contact chamber D and is drawn off and introduced at the top of the contact chamber for renewed contact with the incoming petroleum fractions, will be rendered more fluid, more easily handled, and in better condition to intermingle with the petroleum fractions.

I claim:

1. The improvement in the method of recovering aluminum chloride from aluminum chloride hydrocarbon which consists in supplying a solvent to the aluminum chloride hydrocarbon and subliming the mixture thus produced.

2. The improvement in the art of recovering aluminum chloride from aluminum chloride hydrocarbon which consists in supplying a solvent to and thoroughly mixing it with the aluminum chloride hydrocarbon, and then subjecting the mixture to subliming action.

3. The improvement in the art of recovering aluminum chloride from aluminum chloride hydrocarbon which consists in thinning the aluminum chloride hydrocarbon by the mixture therewith of a solvent and subjecting the resultant mixture in finely subdivided form, to sublimation.

4. The improvement in the art of recovering aluminum chloride from aluminum chloride hydrocarbon which consists in mixing a solvent with the aluminum chloride hydrocarbon, charging a hot gas into the mixture, and then subjecting the resultant material, in finely subdivided form, to sublimation.

5. The improvement in the art of recovering aluminum chloride from aluminum chloride hydrocarbon which consists in thinning the aluminum chloride hydrocarbon by the mixture of a solvent therewith, subliming the resultant mixture to separate a portion of the aluminum chloride hydrocarbon, and then supplying to the residue of the sublimation, another increment of solvent to provide a new mixture, and then subliming said new mixture.

6. The improvement in the art of recovering aluminum chloride from aluminum chloride hydrocarbon which consists in repeatedly subliming the aluminum chloride hydrocarbon after the introduction thereto of a solvent.

7. The improvement in the art of recovering aluminum chloride from aluminum chloride hydrocarbon which consists in repeatedly subjecting the aluminum chloride hydrocarbon to sublimation along with a solvent which is added to the aluminum chloride hydrocarbon previous to the first step of sublimation and thereafter to the residue of each sublimation before the last.

8. The improvement in the art of treating aluminum chloride hydrocarbon catalyst in a contact chamber which consists in mixing with the aluminum chloride hydrocarbon, previous to its introduction into the contact chamber, a solvent that thins aluminum chloride hydrocarbon.

Signed at Chicago, Illinois, this 31st day of March, 1922.

CHARLES OSCAR HOOVER.